(12) United States Patent
Bocchino

(10) Patent No.: US 10,960,402 B2
(45) Date of Patent: Mar. 30, 2021

(54) SKIRT VALVE FOR KITCHEN SINK, AND METHOD OF DISPOSING OF FOOD

(71) Applicant: Green Drain Inc., Naples, FL (US)

(72) Inventor: Jason Bocchino, Naples, FL (US)

(73) Assignee: Green Drain, Inc., Naples, FL (US)

( * ) Notice: Subject to any disclaimer, the term of this patent is extended or adjusted under 35 U.S.C. 154(b) by 196 days.

(21) Appl. No.: 16/086,709

(22) PCT Filed: Nov. 23, 2016

(86) PCT No.: PCT/US2016/063528
§ 371 (c)(1),
(2) Date: Sep. 20, 2018

(87) PCT Pub. No.: WO2017/091692
PCT Pub. Date: Jun. 1, 2017

(65) Prior Publication Data
US 2019/0106871 A1    Apr. 11, 2019

Related U.S. Application Data

(60) Provisional application No. 62/260,089, filed on Nov. 25, 2015, provisional application No. 62/309,189, filed on Mar. 16, 2016.

(51) Int. Cl.
*B02C 23/36* (2006.01)
*E03C 1/266* (2006.01)
(Continued)

(52) U.S. Cl.
CPC .......... *B02C 23/36* (2013.01); *B02C 18/0084* (2013.01); *E03C 1/266* (2013.01); *E03C 1/298* (2013.01)

(58) Field of Classification Search
CPC . B02C 18/0084; B02C 18/0092; B02C 23/36; E03C 1/266; E03C 1/298
(Continued)

(56) References Cited

U.S. PATENT DOCUMENTS 2,594,250 A * 4/1952 Tranbarger ........... E03C 1/2665
241/46.17
2,670,137 A * 2/1954 Hans ..................... E03C 1/2665
241/36
(Continued)

FOREIGN PATENT DOCUMENTS

JP 09217405 A1 8/1997
KR 101529716 B1 6/2015

OTHER PUBLICATIONS

International Search Report and Written Opinion; PCT/US2016/063528; dated Oct. 12, 2017; 17 pgs.; Korean Intellectual Property Office.

*Primary Examiner* — Faye Francis
(74) *Attorney, Agent, or Firm* — Lodestone Legal Group; Jeromye V. Sartain

(57) ABSTRACT

The inventive subject matter provides apparatus, systems, and methods in which a valve mechanism is incorporated into a drain to reduce or prevent noise or food fragments from emitting out of an operating garbage disposal. The valve mechanism is generally a skirt valve biased to a closed position, disposed within a housing, and inserted into a drain such that food or fluid passes through the valve into a downstream grinding device. Once the food or fluid has passed through the valve, the valve closes.

20 Claims, 15 Drawing Sheets

(51) Int. Cl.
    *B02C 18/00* (2006.01)
    *E03C 1/298* (2006.01)
(58) Field of Classification Search
    USPC .......................................... 241/46.013; 4/287
    See application file for complete search history.

(56) References Cited

U.S. PATENT DOCUMENTS

| | | | | |
|---|---|---|---|---|
| 2,724,560 | A * | 11/1955 | Tull | ............... E03C 1/2665 |
| | | | | 241/32.5 |
| 3,432,108 | A * | 3/1969 | Enright | ............... B02C 23/00 |
| | | | | 241/46.016 |
| 3,504,863 | A * | 4/1970 | Ross | ............... E03C 1/2665 |
| | | | | 241/32.5 |
| 3,524,596 | A * | 8/1970 | Smith | ............... F16K 21/04 |
| | | | | 241/46.016 |
| 4,147,630 | A | 4/1979 | Laval, Jr. | |
| 5,370,323 | A * | 12/1994 | Narao | ............... B30B 9/121 |
| | | | | 100/117 |
| 5,601,112 | A | 2/1997 | Sekiya et al. | |
| 7,900,288 | B2 * | 3/2011 | Fima | ............... E03C 1/126 |
| | | | | 4/287 |
| 8,464,970 | B2 * | 6/2013 | Ceru | ............... E03C 1/2665 |
| | | | | 241/21 |
| 9,027,172 | B2 * | 5/2015 | Fima | ............... E03C 1/298 |
| | | | | 4/287 |
| 9,694,362 | B2 * | 7/2017 | Lang | ............... B30B 9/121 |
| 9,752,307 | B2 * | 9/2017 | Bewley, Jr. | ............... B02C 25/00 |
| 10,286,404 | B2 * | 5/2019 | Starkey | ............... B02C 18/0084 |
| 2010/0090040 | A1 * | 4/2010 | Sim | ............... E03C 1/266 |
| | | | | 241/46.013 |
| 2012/0167295 | A1 | 7/2012 | Fima | |
| 2018/0320350 | A1 * | 11/2018 | Schuster | ............... A47L 17/06 |

* cited by examiner

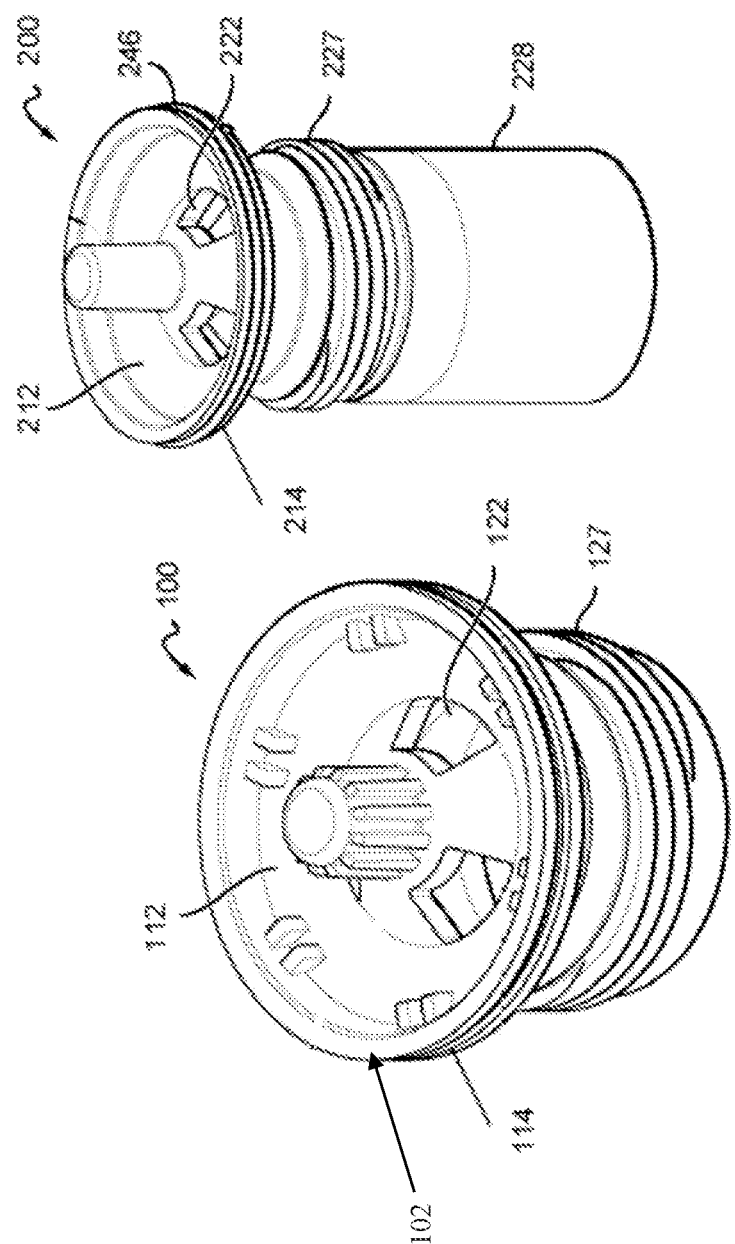

SKIRT VALVE FOR KITCHEN SINK, AND METHOD OF DISPOSING OF FOOD

This application claims priority to U.S. Provisional Application No. 62/260,089, filed Nov. 25, 2015, and U.S. Provisional Application No. 62/309,187, filed Mar. 16, 2016 which are incorporated by reference herein in their entirety.

FIELD OF THE INVENTION

The field of the invention is drainage methods, systems, and devices.

BACKGROUND

The background description includes information that may be useful in understanding the present invention. It is not an admission that any of the information provided herein is prior art or relevant to the presently claimed invention, or that any publication specifically or implicitly referenced is prior art.

It is common in the use of sinks and other, systems with open drains for debris, such as food scraps, to flush into the drain. Such debris has the potential to obstruct the drainage pipes, and so it is common to include a grinding device such as a garbage disposal to pulverize the debris. However, these grinding devices are generally loud when operated alone and can be louder depending on the type of debris being pulverized. Further, it is non-uncommon for the grinding device to cast debris fragments out of the drain during operation. Attempts have been made to solve the noise and debris fragment problem of garbage disposals, but the solutions have been lacking.

It is known to incorporate a twist valve into sink drains. Such devices are opened or closed primarily in an effort to start and stop the flow of debris through the drain. However, such devices can be manually opened and closed before and after activating a garbage disposal. While such valves can be effective at reducing noise, it is not appealing to the consumer market because they require active, manual use rather than providing a passive, automatic noise reduction.

Duck bill valves offering passive valve closure include U.S. Pat. No. 6,401,266 to Mitchell et al.; U.S. Pat. Appl. No. 2006/0010565 to Cummings (Publ. May 2006); U.S. Pat. Appl. No. 2006/0207005 to Janssen (publ. September 2006); and WIPO Patent Appl. No. 2009/040524 to McAlpine (publ. April 2009). However, the known duck bill valves are not well suited to permit the passage of larger sized debris. Further, duck bill valves tend to retain a small amount of fluid after each use which could lead to mold or odors.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there remains a need for a system and method that provides passive closure of sink drains, while still permitting the passage of larger food debris, such that the noise of operating a garbage disposal is reduced.

SUMMARY OF THE INVENTION

The inventor has now discovered that placing a valve upstream of a garbage disposal very significantly reduces user-perceived sound emanating from use of the disposal, as well as reducing or preventing the ejection of food fragments from the disposal.

Various objects, features, aspects and advantages of the inventive subject matter will become more apparent from the following detailed description of preferred embodiments, along with the accompanying drawing figures in which like numerals represent like components.

In one aspect, the inventive subject matter generically contemplates a grinding device having a valve and a grinding chamber.

In preferred embodiments, the valve is a downwardly-sloping, gravity flow valve, which is configured to be biased to a closed position. As used herein, the term "gravity flow valve" means a valve in which fluid and debris flows through the valve primarily as a result of the force of gravity. Such valves preferably remain closed unless opened when a pressure of a fluid or debris on an upper surface of the valve exceeds a predetermined threshold. This is beneficial because the valve opens when fluid or debris is present on the surface of the valve, but otherwise remains closed, which advantageously reduces the operating noise of a grinding device as perceived by the operator.

The valves, diaphragms, conical barriers, and other components of the embodiments discussed throughout this application can be constructed of a pliant material. In preferred embodiments of the inventive concept the components are constructed of a material that is resistant to decomposition, oxidation, and/or biological activity. Suitable materials include mold resistant rubber, silicone, nitrile rubber, polyethylene, a perfluoroelastomer, an ethylene acrylate elastomer, and polychloroprene. It should be appreciated that various components of the inventive subject can comprise different or substantial the same materials.

In preferred embodiments, grinding chambers have blunt or bladed arm that rotates within a partially enclosed chamber. Some contemplated grinding chambers are adapted to grind food. Where such devices are fluidly coupled to a drain, the chambers include garbage disposals. As used herein, "garbage disposal" has its ordinary meaning as exemplified by the InSinkErator™. Other contemplated grinding chambers are of the type used to process food, such as blenders, mixers, and food processors, and in such instances the grinding chambers are not usually coupled to a drain. In still other instances, contemplated grinding chambers include devices used to grind non-food debris, for example, yard clippings, stone, gravel, ice, plant fibers, and wood. It should be appreciated that the operation of such devices is associated with noise, which at times is extremely loud and disturbing. In addition to noise, some grinding devices or grinding substrate/debris create the risk of substrate/degree fragments being ejected from the device while in operation.

Contemplated valves and grinding chambers can be coupled in any suitable manner. Valves will typically be disposed in a valve house, having an outer surface configured to form a seal when inserted into an opening, such as a drain. In some embodiments, the outer surface includes grooves that mate with the grooves of a sink drain or grooves on a garbage disposal. In some embodiments, the outer surface includes rubberized baffles that form a snug fit when inserted into an opening. It is contemplated that the seal formed between the housing and the opening may be formed by a chemical bond, a magnetic attraction, an electromagnetic force, friction, gravity, adhesion, suction, spring, or other appropriate means.

As used herein, the term "drain" means a fluid outlet such as that found in urinals, sinks, tubs, floor drains, or other drains through which fluid can flow. The term "fluidly connected" means a connection which permits the passage or flow of a fluid.

In one aspect, the inventive subject matter contemplates a method for reducing the volume of noise caused by a grinding device. The noise caused by a grinding device could be from operating a food finder, garbage disposal, food processor, or other grinding device as referenced throughout this application. The method can involve directing a substance, for example food or other debris, through a housing. In preferred embodiments, the housing comprises a valve biased to a closed position. Directing the substance through the housing can be accomplished by, for example, flushing the substance with a fluid as well as placing, pushing, dropping, or otherwise causing the substance to move through the housing. In preferred embodiments the substance is food debris, but can also be any of the other types of debris referenced in this application. In some embodiments, the method further comprises activating a grinding device. In preferred embodiments, the method includes flushing food debris through a gravity flow valve and into a garbage disposal.

In one aspect, the inventive subject matter contemplates a method for reducing or preventing substrate/debris fragments from being east out of a grinding device. The projected fragments emitted from a grinding device could be from operating a food grinder, garbage disposal, food processor, or other grinding device. The method can involve directing a substrate, for example food or other debris, through a housing having a valve biased to a closed position.

Directing the substrate through the housing can be accomplished by, for example, flushing the substrate with a fluid as well as placing, pushing, dropping, or otherwise causing the substance to move through the housing. In preferred embodiments the substance is food debris, but can also be any of the other types of debris as appropriate for the grinding device. The method can include activating the grinding device. In preferred embodiments, the method includes flushing food debris through a gravity flow valve and into a garbage disposal.

In one aspect of the inventive subject matter, a system for grinding is contemplated. In some embodiments, the system is a food disposal system. In some embodiments, the system can include a basin having an opening in the bottom of the basin, a grinding device, and a skirted valve between the opening in the basin and the grinding device. Viewed from one perspective, the system comprises a channel having a sink, a drain, a skirted valve, and a garbage disposal unit, in sequence. The basin can be a bowl, dish, bucket, sink, vat, tank, or other receptacle. In some embodiments, the opening in the basin is sized such that debris of the types referenced throughout this application can fit in and through the opening.

In preferred embodiments, the housing is sized and dimensioned such that at least a partial seal is formed between the housing and the opening in the basin. In some embodiments, the housing forms at least a partial seal between the housing and the grinding device. In some embodiments, the housing is removable from the basin or the minding device. In some embodiments, the skirted valve is threadedly coupled to a garbage disposal unit. Threadedly coupled could includes both the valve screwed directly into the disposal unit, as well as the valve indirectly threaded by use of bolts, nuts, or screws.

In some embodiments, the skilled valve is housed in a consumer replaceable cartridge. A consumer replaceable cartridge is one with simplified removal and replacement mechanisms. For example, the replacement mechanism is such that no tools are required to remove and replace the cartridge. Further, a consumer-replaceable cartridge can include a mechanism that requires the use of simple tools such as a wrench, screwdriver, pliers, or a pry bar to remove and replace the cartridge. It is contemplated that the cartridge fit into a receptacle as-is, though it should be appreciated that an adaptor can be used as appropriate. Connectors or screws are used to couple the cartridge to the receptacle, but other fasteners are also contemplated. The cartridge receptacle can be part of a sink drain or part of a grinding chamber.

In one aspect of the inventive subject matter, a method for sealing a chamber is contemplated. In some embodiments, the chamber can be an enclosed grinding device of the type referenced in this application. In preferred embodiments, the chamber is an enclosed garbage disposal device. In some embodiments, the method comprises fluidly directing a plurality of debris into a housing. In some embodiments, both the housing and the debris can be of the types described in this application. In preferred embodiments, after the debris has passed through the housing and into the chamber, a valve within the housing moves to a closed position, preferably automatically or otherwise without the direction of a user. The closed position at least partially seals the chamber.

In one aspect of the inventive subject matter, a method for reducing an operating noise is contemplated. In some embodiments, the method includes providing a skirt valve disposed within a housing. In some embodiments, the skirt valve has an inlet through which debris can enter the valve, and an outlet through which debris can exit the valve. A skirt valve of the inventive concept includes a conical barrier. In such a device a conical barrier can be shaped as a frustum of a cone. In some embodiments, the conical barrier has an aperture located centrally in the smaller upper base, which is used in mounting the barrier. In preferred embodiments the upper base is positioned toward the valve inlet. In some embodiments the conical barrier is constructed of a pliant material, the thickness of which can decrease between the smaller upper base and the larger lower base. As such, in addition to being pliant the conical barrier can have a pliancy that changes along its axis (for example, having increased pliancy towards the larger lower base). In some embodiments, the conical barrier can be mounted by means of a central aperture located in the upper base. In a preferred embodiment the conical barrier is mounted on a central shaft that passes through the aperture. In some embodiments the central shaft is positioned within the body of the skirt valve. In some embodiments, a portion of the conical barrier proximal to the lower base is biased to a position abutting a sealing surface of the valve body. In some embodiments, the lower base and sealing surface are positioned toward the valve outlet. The conical barrier can be constructed of a pliant material, which permits fluids to flow past the conical barrier by moving it away from the sealing surface as pressure is applied to the upper surface of the conical hairier.

In further embodiments of a method to reduce operating noise, a flow of fluid is directed through the skirt valve. In some embodiments the fluid can be directed through gravity, pressure, suction, or another appropriate force. In some embodiments of a method to reduce operating noise, the conical barrier returns to a closed position abutting the sealing surface after the fluid has passed the conical barrier.

In some embodiments, a method for guiding a person to muffle sound emitted from a garbage disposal is contemplated. Such methods include providing a providing a gravity flow valve that is biased to a closed position. The valve opens automatically when pressure is applied to a top surface of a diaphragm portion of the gravity flow valve. Instructions are further provided directing the person to utilize the gravity flow valve in conjunction with a garbage, disposal, such that food entering the gravity flow valve passes through the gravity flow valve, and subsequently into the garbage disposal. In some embodiments, a kit comprising the gravity flow valve and garbage disposal is further sold to a person, where the valve and disposal can be uncoupled or physically coupled. It is contemplated that the gravity flow valve be disposed in a cartridge, and further instructions are provided for replacing or installing the cartridge.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The discussion throughout this application provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

BRIEF DESCRIPTION OF THE DRAWING

FIGS. 1A-1C are a top perspective view, a vertical cross-sectional view, and an exploded view, respectively, of one embodiment of a device for reducing the sound of operating a grinding device.

FIG. 2 is a side perspective view of another embodiment of a device for reducing the sound of operating a grinding device.

DETAILED DESCRIPTION

The inventive subject matter provides apparatus, systems, and methods providing passive closure of drains while allowing food debris to pass through the drain. The desired effect of this passive closure is, in part, reduced volume or reduced ejection of fragments from grinding device when it is operated.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1B:
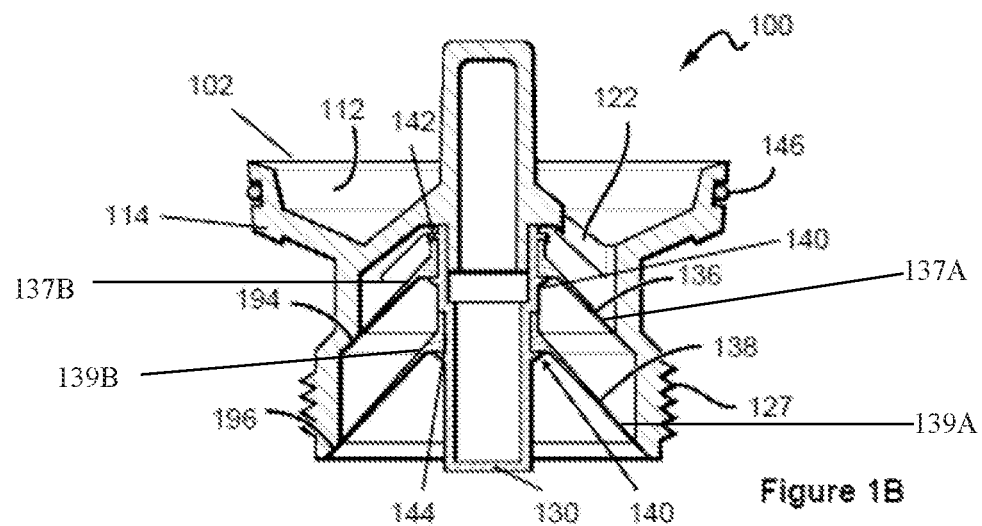
Figure 1C:
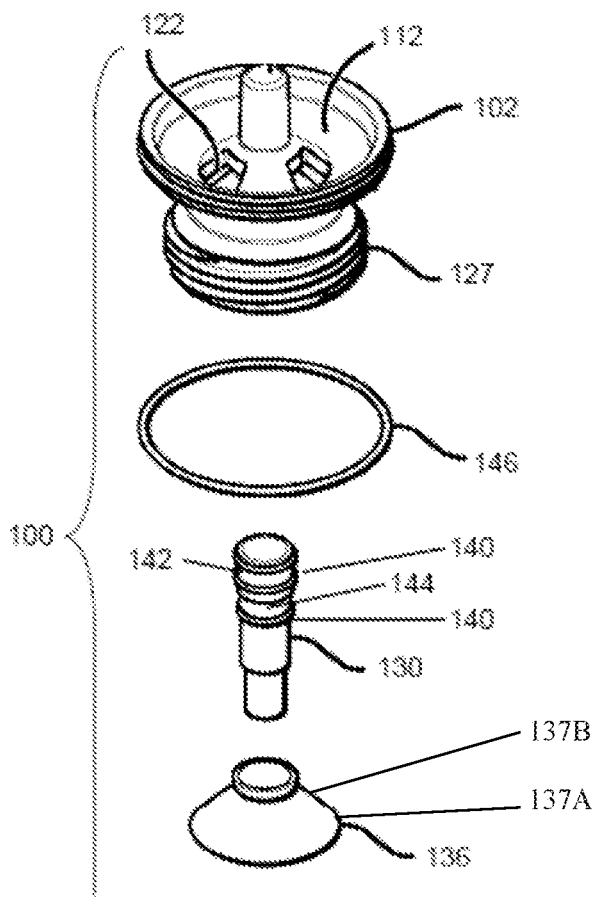

In FIGS. 1A-1C, one embodiment of a device 100 is shown for reducing the ejection of debris fragments or the sound of operating a grinding device that includes a housing 102 having multiple openings 122 disposed on an upper surface 112 of the housing 102. It is contemplated that the upper surface 112 can be downwardly sloped to direct fluid toward openings 122. The housing 102 can be composed of any commercially suitable material(s) including, for example, plastics and other polycarbonates, metal, quartz, porcelain, and any combination(s) thereof.

In some contemplated embodiments, housing 102 can be sized and dimensioned to fit within a drain such as those found in sinks, urinals, and floor drains, for example. However, it is alternatively contemplated that the device 100 can be sized and dimensioned to fit within a cartridge. Although housing 102 preferably has a horizontal cross-section that is circular in shape, the shape of the housing 102 can be varied to correspond to the shape of the drain or cartridge.

Device 100 can include an outwardly projecting flange 114 that can be used to allow the device 100 to rest on a portion of a cartridge or drain. Optionally, a pliable plastic or elastomeric seal ring 146 can be disposed about at least a portion of the flange 114 to create a fluid seal. Device 100 can further include threads 127 that are configured to mate with threads of a drain or cartridge, such that the device 100 can be secured in place. In this manner, the device 100 can be removably threaded and thereby secured or removed from, a drain or cartridge. However, other commercially suitable fasteners could be substituted for threads 127 such that the device 100 can be secured in place.

Device 100 can advantageously include first and second valves 136 and 138 disposed in housing 102, which are configured to prevent sound from emanating from downstream of the device 100. FIG. 1C depicts a device 100 advantageously having only one valve, valve 136. It is contemplated by the inventive subject matter that embodiments could include at least one valve, such as valve 136. However, dual valve systems are contemplated that optionally provide additional protection against the escape of sound or ejection of debris fragments through the drain. For example, even if the primary first valve 136 was somehow stuck open by a toothpick or other debris, the secondary valve 138 would still prevent downstream sound or debris fragments from escaping from the device 100.

Preferably, each of the valves 136 and 138 is coupled to a stem 130, and in some contemplated embodiments, the stem 130 can extended through each of the valves 136 and 138. Optionally, as shown in FIG. 1B, the stem 130 can include a bump or extended portion 140 disposed beneath each of the valves 136 and 138. The bumps or extended portions 140 can help support the valves 136 and 138, especially where the valves have a diameter greater than 4" or a thickness that is sufficiently thin to cause the valves 136 and 138 to otherwise collapse under normal flow. Alternatively or additionally, stem 130 can include first and second recessed portions 142 and 144 sized and dimensioned to receive the first and second valves 136 and 138, respectively.

In preferred embodiments, each of the valves 136 and 138 is a gravity flow valve that is biased closed such that the valves 136 and 138 are closed when not in use. Such valves advantageously can operate without electricity, and function to create a closed system, where the valves close automatically once the fluid or debris passes through the valves. The valves 136 and 138 can have a flexible membrane that can comprise any commercially suitable material(s) including, for example, silicon fabric or other synthetic, natural, and/or flexible materials, or combinations thereof, which provide protection to the valves from significant damage or degradation by debris and cleaning solvents. It should be appreciated that suitable materials for the valves include materials that provide both rigidity and flexibility. The valves 136 and 138 can be used to regulate various fluids including, for example, water, cooking fluids, cleaning fluids, fluids carrying substrates such as food debris, and combinations thereof.

It is especially preferred that each of the valves 136 and 138 is a skirt valve, which has a downwardly-sloping rim extending from a center portion of the valve where the rim has a flexible outer portion. As used herein, the term "downwardly-sloping" refers to sloping in the direction of predominant fluid flow, which might or might not be downward in a gravitational sense, depending on the orientation of the valve.

Figures 12A, 12B:
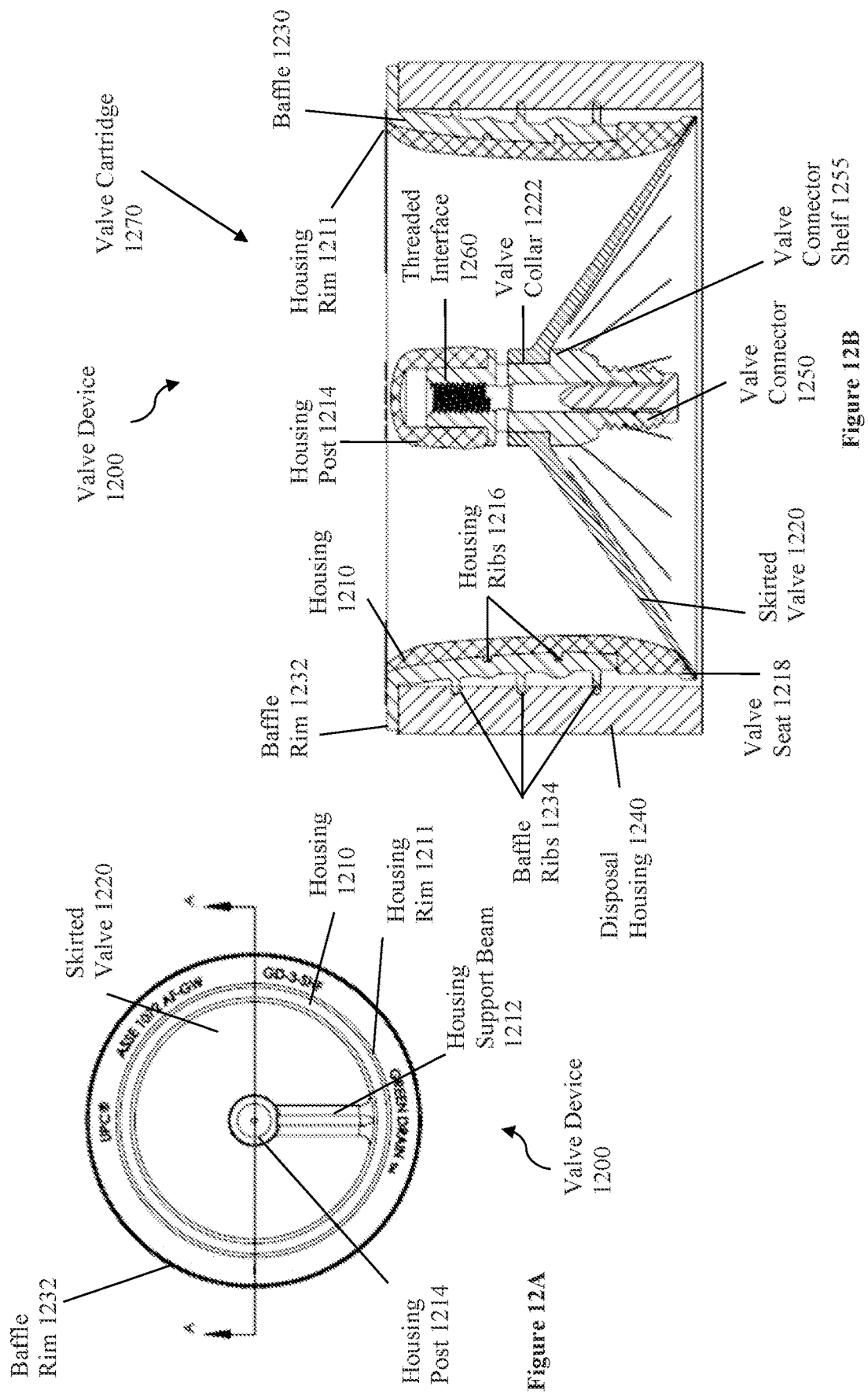
FIGS. 12A-12B are top and vertical cross-sectional views of an embodiment of a device for reducing the sound of a garbage disposal.
Figure 13:
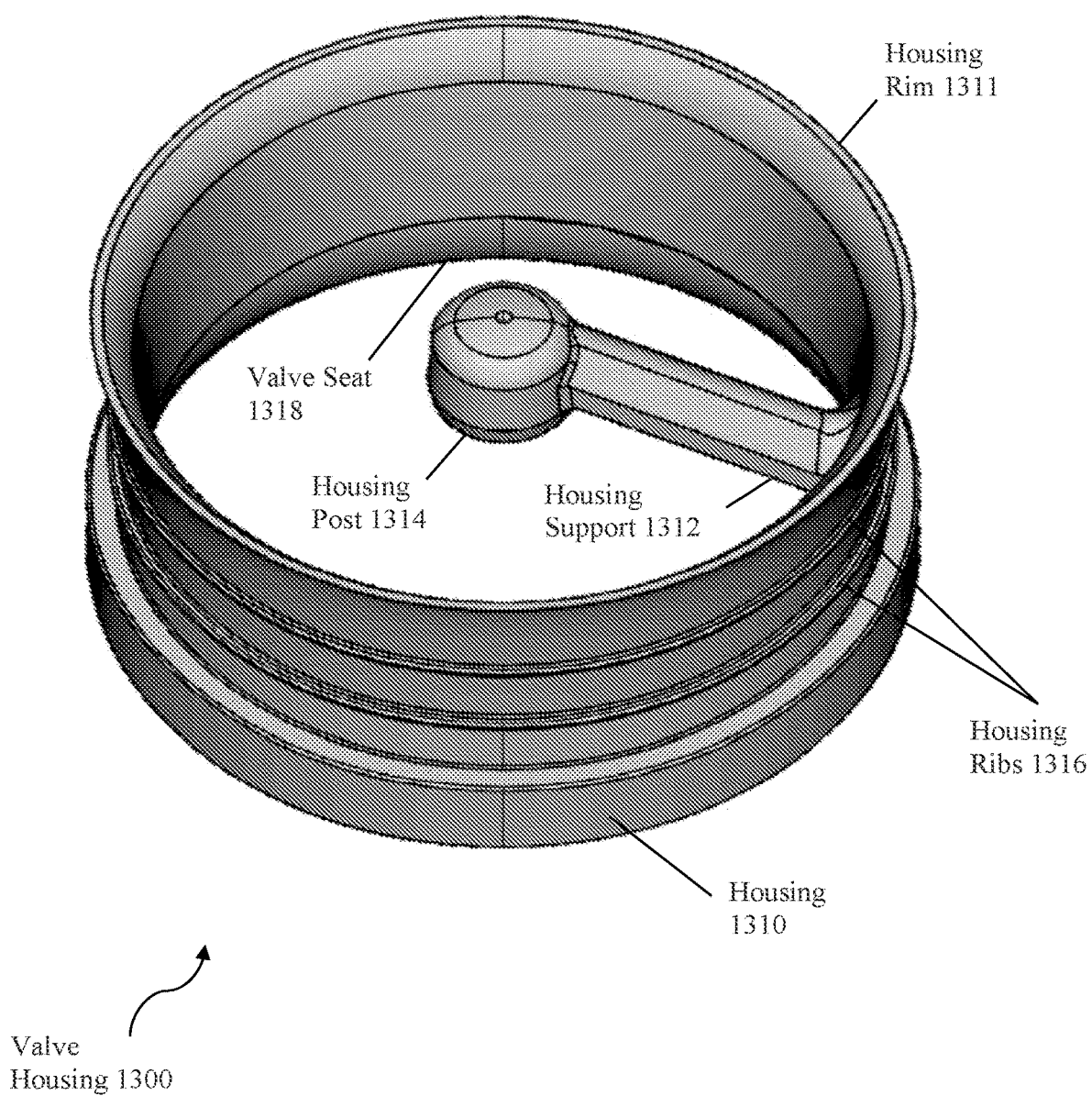
FIG. 13 is a perspective view of an embodiment of a valve housing.
Figure 14:
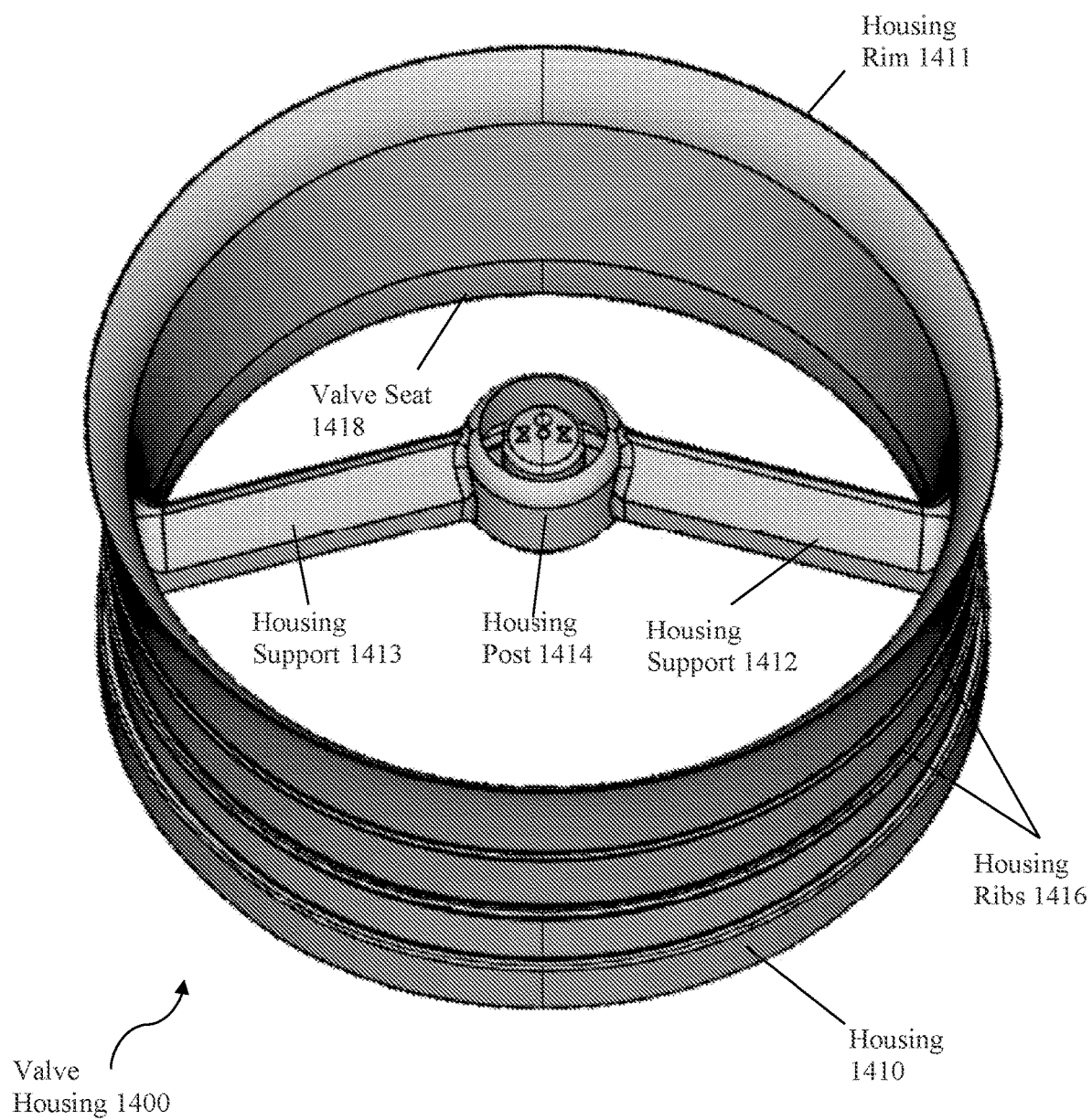
FIG. 14 is a perspective view of another embodiment of a valve housing.

It should be appreciated that housing 102 of FIGS. 1A-C can have different configurations. For example, housing 102 can have the configuration and features of valve cartridge 1270, valve housing 1300, or valve housing 1400, as depicted in FIGS. 12B, 13, and 14 and described below.

Figure 5A:
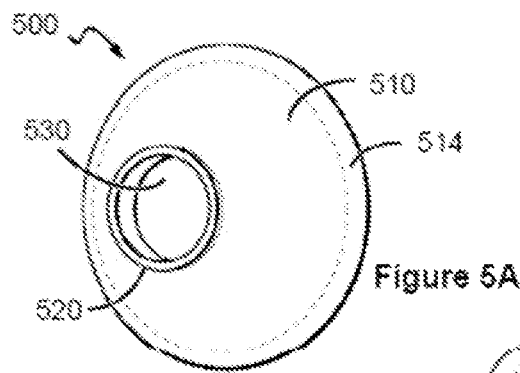
FIGS. 5A-5B are top and bottom perspective views, respectively, of an embodiment of a valve.
Figure 5B:
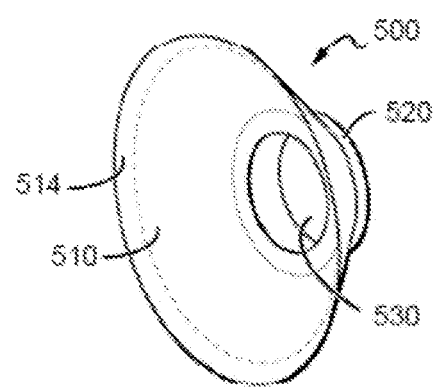
Figure 5C:
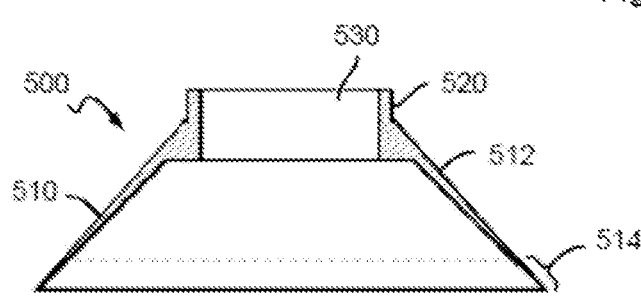
FIG. 5C is a cross-sectional view of the valve of FIGS. 5A-5B.

An sample embodiment of a skirt valve is shown in FIGS. 5A-5C. Skirt valves possess numerous advantages over other one-way valves such as umbrella valves and duckbill valves. For example, the skirt valve can be mounted about a stem or post to create a 360 degree opening that is less likely to be jammed by solid items. In addition, the skirt valve typically lacks a spoke to hold the center of the valve in place, and therefore lacks the problems associated with the spokes catching foreign objects. Furthermore, the skirt valve can have a thicker first portion that is coupled to a stem or post of the cartridge, and a thinner second portion that allows for greater flexibility of the valve. In this manner, the skirt valve can be (1) much more rigid than an umbrella valve to (a) keep the valve closed when not in use and (b) prevent back pressure in the drain from opening the valve, while (2) the ends of the skirt valve are flexible enough to allow for fluid flow or debris to pass through the valve.

Although less preferred, other commercially suitable valves could be used including, for example, umbrella valves, duck bill valves, and other flexible valves.

It is especially preferred that the valves 136 and 138 can be disposed within housing 102 such that an end portion of each of valves 136 and 138 is seated beneath first and second downwardly-sloping valve seats 194 and 196 of housing 102, respectively. In this manner, any backflow or pressure beneath the valves 136 and 138 will keep one or both of the valves 136 and 138 pressed against respective valve seats 194 and 196, and thus the valves 136 and 138 remain sealed preventing downstream liquids, gases, debris, or sounds from getting past the valves 136 and 138.

The valves 136 and 138 are preferably tapered, such that each valve has a varying thickness along its respective radius. In this manner, the valves 136 and 138 can each comprise a rigid inner portion 137B and 139B with a flexible outer edge interval 137A and 139A, respectively. In some contemplated embodiments, each of the valves 136 and 138 can include an outer edge interval of 5 mm that is sufficiently thin to allow even small amounts of fluid or debris to pass by valves 136 and 13, while retaining sufficient strength for durability at inner portions 137B and 139B, respectively. Preferably, the outer edge intervals 137A and 139A of the first and second valves 136 and 138 has an average thickness that is less than 95%, and more preferably less than 90% and in some embodiments less than 80%, of an average thickness of the inner portions 137B and 139B, respectively.

In especially preferred embodiments, the outer 5 mm edge interval 137A of the first (upper) valve 136 has a first average thickness that is less than 95% of a second average thickness of the outer 5 mm edge interval 139A of the second (lower) valve 138. As used herein, the term "outer 5 mm edge interval" means the portion extending from the outer edge of the valve inwards by a distance of 5 mm. For example, the outer 5 mm edge interval of a circular valve having a radius (r) of 20 mm is the outer 15-20 mm from a center of the circular valve, or an area represented by the formula: $(\pi*r^2)-(\pi*(r-5)^2)$. In this example, the area would be approximately 549.8 mm. Similarly, the term "outer 1 mm edge interval" means the outer 1 mm edge portion extending about an exterior of the valve. One of ordinary skill in the art would of course understand that square, ovular, and other commercially suitable sizes and dimensions of valves could alternatively be used, and the outer x edge interval would still be applicable.

It is further contemplated that the first average thickness of the outer edge interval could be less than 90%, 85%, 80%, 75%, or 70% of the second average thickness of the second outer 5 mm edge interval 139A. It is further contemplated that the flexible edge interval of the valve could be the outer 1 mm, 3 mm, 7 mm, 10 mm, 15 mm, 20 mm, and so forth, of the valve and will likely depend upon the size and dimension of the valve, and the fluid regulated by the valve.

The thinner outer edge interval 137A of the first valve 136 advantageously ensures that fluid or debris will easily flow past the first valve 136 and eliminate sound or debris fragments from escaping the drain, while the thicker outer edge interval 139A of the second valve 138 ensures that the second valve 138 will remain sealed even if there is backflow, back pressure, or debris fragments projected from downstream of the second valve 138.

Each of the valves 136 and 138 can have a circular horizontal cross-section that includes a center portion configured to be anchored to a stem 130. In this manner, ribs are not needed to anchor the valves 136 and 138, which ensures that solids such as food debris are less likely to clog the device 100. In optional embodiments, the device 100 can further include a cap (not shown) coupled to the stem 130.

The second valve 138 can be disposed downstream of the first valve 136, and is preferably separated from the first valve 136 by a distance of less than six inches, more preferably less than three inches, and more preferably, less than one inch. All commercially suitable configurations are contemplated for the first and second valves 136 and 138, and preferably, the valves 136 and 138 are biased to be convex in the upstream direction.

Figure 10:
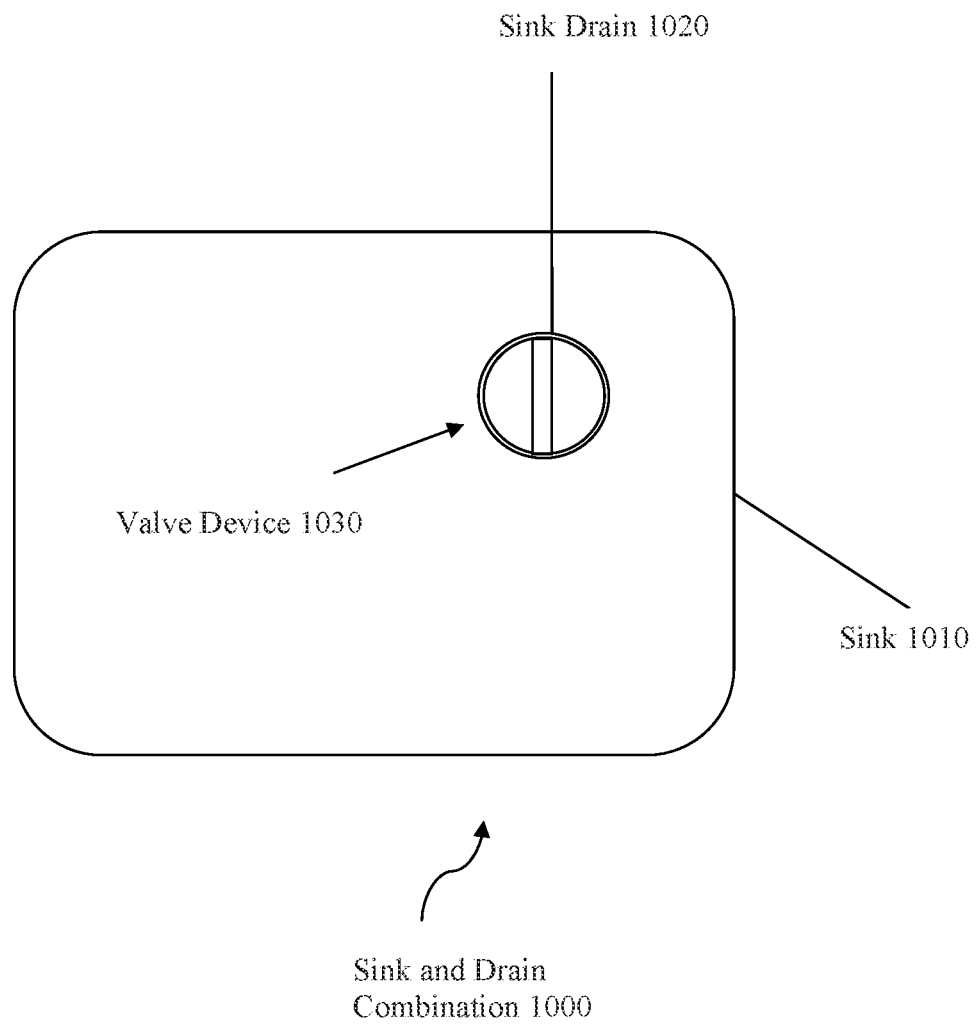
FIG. 10 is a top down view of an embodiment of a valve attached to a sink drain.

FIG. 2 illustrates an embodiment of a valve device 200 attached to a disposal device 228. In this embodiment of the inventive subject matter, valve device 200 fluidly connects directly to disposal device 228 rather than, as depicted in FIG. 10, the valve device connecting to a sink drain. In this embodiment, the volume of sound from operating disposal device 228 is reduced as perceived by a user, and the ejection of debris fragments flour within disposal device 228 is prevented. With respect to the remaining numerals in FIG. 2, the same considerations for like components with like numerals of FIG. 14-C apply.

Figure 3:
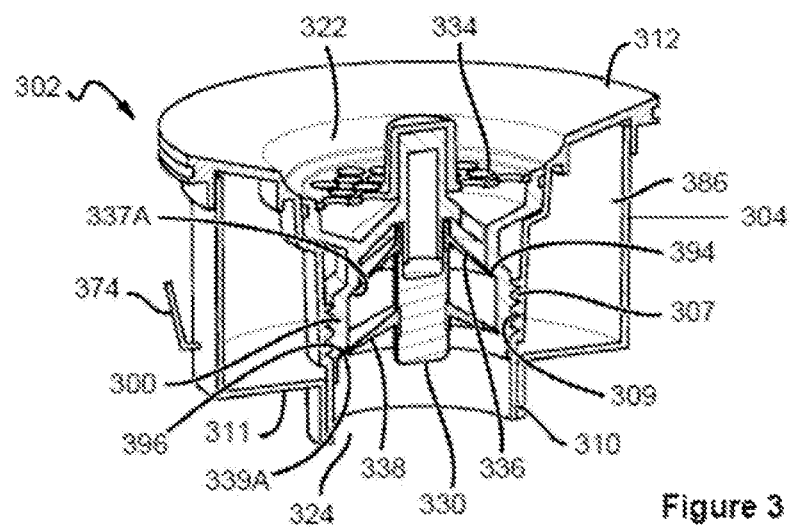
FIG. 3 is a vertical cross-sectional view of an embodiment of a device reducing the sound of operating a grinding device.

In FIG. 3, an embodiment of a device 300 is shown that is disposed within a cartridge 302. The cartridge 302 can include a housing 304 that comprises inner and outer portions 310 and 311, respectively, although it is contemplated that the housing 304 can comprise a single piece.

Preferably, the device 300 is configured to be user-removable from the housing 304, to provide easy access to device 300 and the drain for maintenance or other needs. In this manner, a user can easily access a drain pipe downstream of the device 300 by removing the device 300. This allows for a plumber's snake or other tool to be ran through the cartridge 302 without requiring removal of the cartridge 302 itself. It is contemplated that each of the housing 304 and device 300 can be composed of any commercially suitable material(s) including, for example, plastics and other polycarbonates, metal, quartz, porcelain, and any combination(s) thereof.

Cartridge 302 is preferably sized and dimensioned to fit within a drain recess, including, for example, drains found in tanks, vats, floor drains, and sinks. Although cartridge 302 preferably has a horizontal cross-section that is cylindrical in shape, the shape of cartridge 302 can be varied to correspond to the drain's shape. Alternatively, an adapter (not shown) can be used to adapt the cartridge 302 to the drain's size and dimension. The top 312 of cartridge 302 can include a downward slope to facilitate fluid and debris flow to openings 322.

Device 300 can include threads 309 that are configured to engage with threads 307 disposed on the inner portion 310 of housing 304. In this manner, device 300 can be removably threaded and thereby secured or removed from, housing 304. However, other commercially suitable fasteners could be substituted for threads 307 and 309 such that the device 300 can be removably inserted within housing 304. To ensure an effective seal is maintained between the housing 304 and device 300, one or more o-rings or other commercially suitable flexible seals can be disposed about device 300. Alternatively, such flexible seal could be coupled to housing 304.

Device 300 preferably includes valves 336 and 338 to provide additional protection against the escape of sound from a grinding device. Preferred valves comprise gravity flow valves that are biased closed such that the valves 336 and 338 are closed when not in use. Each of valves 336 and 338 can comprise a skirt valve, although other commercially suitable gravity flow valves could alternatively be used including, for example, umbrella valves, duck bill valves, and other flexible valves. Valves 336 and 338 can include a flexible, synthetic membrane that can comprise any commercially suitable material(s) including, for example, silicon fabric or other synthetic and/or flexible materials, or combinations thereof, which provide protection to the valves from significant damage or degradation by fluids, debris, and cleaning solvents.

Each of the first and second valves can have an outer edge interval 337A and 339A, respectively. Preferably, the average thickness of the first outer edge interval 337A is less than the average thickness of the second outer edge interval 339A. More preferably, the average thickness of the first outer edge interval 337A is less than 95%, and most preferably, less than 80% of the average thickness of the second outer edge interval 339A.

The second valve 338 can be disposed downstream of the first valve 336. In some embodiments, a single valve suffices to embody the inventive subject matter. In preferred embodiments, the first and second valves 336 and 338 are separated by a distance less than or equal to six inches, and more preferably, less than or equal to three inches. All commercially suitable configurations are contemplated for the first and second valves 336 and 338, and preferably, the valves 336 and 338 are biased to be convex in the upstream direction. Preferably, the first valve 336 has a rigidity that is eater than a rigidity of the second valve 338.

Valves 336 and 338 are preferably disposed within device 300 rather than cartridge 302 which advantageously allows the valves 336 and 338 to be removed for cleaning or replacement without necessitating removal of the cartridge 302 from a sink or other drain. In this manner, an interior of the device 300 can define a passageway configured to allow fluid and debris to flow from the first valve 336 to the second valve 338 to the outlet 324. However, it is also contemplated that at least one of valves 336 and 338 could be disposed elsewhere within cartridge 302. It is especially preferred that the valves 336 and 338 can be disposed such that an end portion of the valves 336 and 338 is each seated beneath downwardly-sloping valve seats 394 and 396, respectively. In this manner, any backflow or pressure beneath the valves 336 and 338 will keep the valves 336 and 338 pressed against the respective valve seats 394 and 396, and thus the valves 336 and 338 can remain sealed.

To prevent removal of the cartridge 302 from a drain housing, one or more barbs 374, and preferably at least three barbs 374 can extend from the cartridge 302. In this manner, should someone attempt to remove the cartridge 302, the barbs 374 would dig into an inner portion of the drain housing and thereby inhibit removal of the cartridge 302. It is contemplated that the barbs 374 could be composed of stainless steel or any other commercially suitable material(s) such that the barbs 374 have sufficient strength to withstand an applied force of at least 10 N and resist removal of the cartridge 302.

Figure 4:
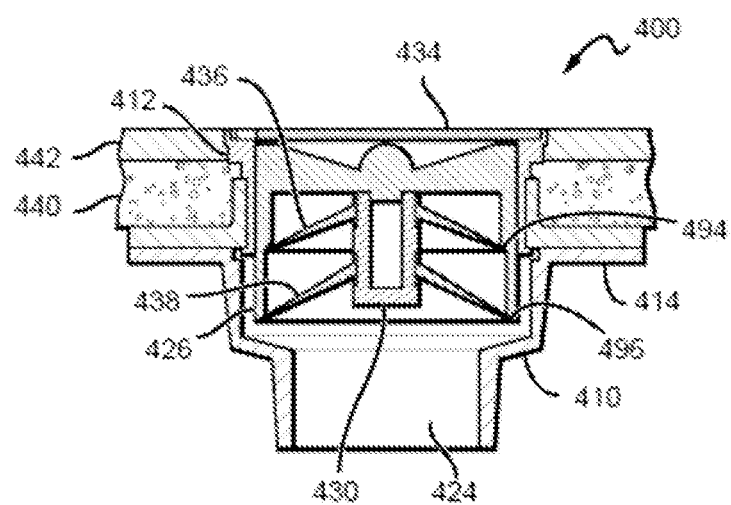
FIG. 4 is a vertical cross-sectional view of one embodiment of a device for reducing the sound of operating a grinding device.

In FIG. 4, a device 400 is shown into which a device 426 having first and second valves 436 and 438 can be inserted. The valves 436 and 438 are preferably gravity flow valves, which are each disposed about a stem 430 disposed in the device 400. In this manner, fluid and debris can flow through openings 422 into the device 426 and past the valves 436 and 438. The fluid and debris can then exit the device 426 through outlet 424.

As shown in FIG. 4, the device 400 can be disposed within a drain 440. The housing 410 of the device 400 can include an outwardly extending portion 414 configured to maintain the position of the housing 410 with respect to the drain 440. With respect to the remaining numerals in each of FIG. 4, the same considerations for like components with like numerals of FIG. 3 apply.

FIGS. 5A-5C illustrate various views of a skirt valve 500 that includes a core 520, and an elongated rim 510 that extends outwardly from the core 520. Preferably, the rim 510 is configured to have a downwardly-sloping surface as the rim 510 extends from core 520. It is especially preferred that the rim 510 is sloped at an angle of 30 degrees, although other angles could be used depending upon the application. In some contemplated embodiments the core 520 and the rim 510 can be composed of a single piece, although the core 520 and rim 510 could alternatively be separate pieces that are coupled to create a seal therebetween. Although the skirt valve 500 is shown to have a circular shape, all commercially suitable shapes are contemplated including, for example, a square shape, an ovular shape, an icosagon-shape and a half-circle shape.

Preferably, the rim 510 extends from the core 520 in a 360 degree manner. As shown in FIG. 5C, the rim 510 can be tapered and include an inner portion 512 and an outer edge interval 514. In this manner, the inner portion 512 can have a greater average thickness than the outer edge interval 514, which gives the inner portion 512 additional rigidity, while giving the outer edge interval 514 greater flexibility than the inner portion 512. Thus, unlike umbrella valves of the prior art, at least one-eighth, preferably one-third, more preferably at least one-half, and most preferably, at least three-fourths, of the rim 510 can remain rigid, and provide sufficient strength such as to prevent backflow and sound from getting upstream through the valve 500.

In an exemplary embodiment, the inner portion 512 of the rim 510 can have an average thickness of between 0.001-0.08 inches, more preferably of between 0.001-0.04 inches, and still more preferably of between 0.001-0.01 inches. Using the same example, the outer edge interval 514 could have an average thickness that is less than 95%, more preferably 90%, 85%, 80%, 75%, 70%, 65%, 60%, 55%, or 50%, of the average thickness of the inner portion 512. However, the specific average thicknesses of the inner portion 512 and the outer edge interval 514 will depend on the size and dimension of the skirt valve 500, and the specific application.

The core 520 can advantageously include an opening 530 such that the core 520 can be mounted or other affixed to a stein or post of a cartridge or other valve housing. This advantageously eliminates the need for spokes or other means that extend above the valve 500, which are prone to collecting debris.

Optionally, the skirt valve 500 could include one or more ribs (such as those shown in FIGS. 84-9B) extending from the core 520 along a portion of the rim 510 to provide additional support to the rim 510.

Figure 6:
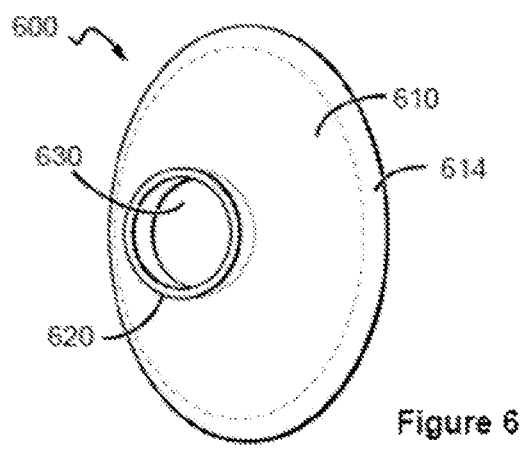
FIG. 6 is a perspective view of an embodiment of a valve.
Figure 7:
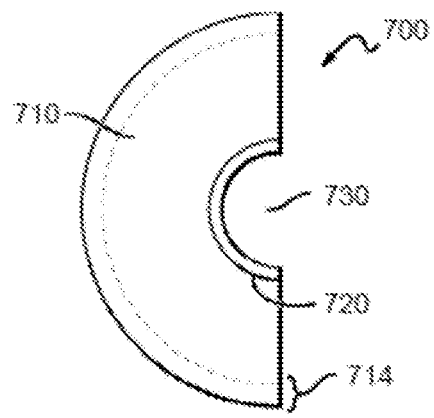
FIG. 7 is a top view of another embodiment of a valve.

In FIG. 6, a valve 600 including a rim 610 that has an ovular horizontal cross-section, and includes an inner portion 612 and an outer edge interval 614. With respect to the remaining numerals in FIG. 6, the same considerations fore like components with like numerals of FIGS. 54-5C apply. FIG. 7 illustrates a valve 700 that includes a rim 710 having a semi-circular horizontal cross-section. With respect to the remaining numerals in FIG. 7, the same considerations for like components with like numerals of FIGS. 5A-5C apply.

Figure 8A:
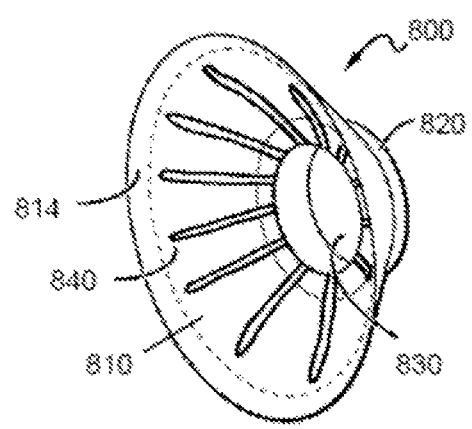
FIGS. 8A-8B and 9A-9B are various embodiments of a valve having ribs.
Figure 8B:
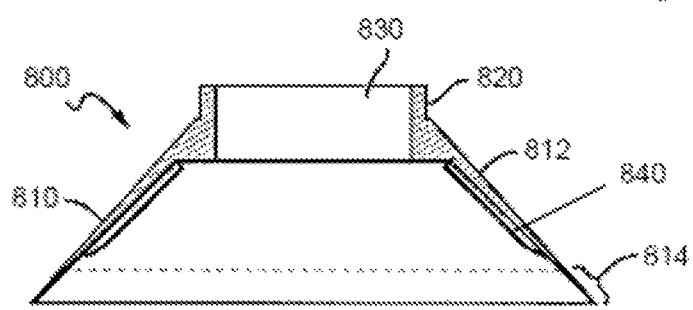

In FIGS. 8A-8B, an embodiment of a skirt valve 800 is shown having a plurality of ribs 840 extending radially from the core 820 to provide additional support to the rim 810. Preferably, the ribs 840 are disposed on a lower (downstream) surface of the valve 800. The addition of ribs 840 is beneficial, especially where the skirt valve 800 has a diameter or length of three inches or greater. In some contemplated embodiments, the ribs 840 could have a diameter of between 0.03-0.1 inches, and more preferably, of between 0.04-0.08 inches. However, the specific thickness of the ribs 840 will depend on the diameter or length of the skirt valve 800, and the specific application. For example, the ribs 840 might be thicker for a skirt valve having a larger diameter, and thinner for a skirt valve having a smaller diameter. With respect to the remaining numerals in each of FIGS. 8A-8B, the same considerations for like components with like numerals of FIG. 5A apply.

Figure 9A:
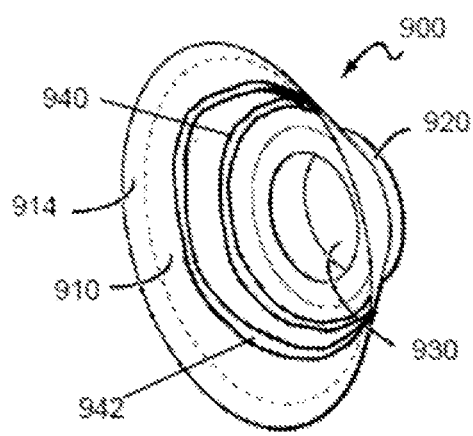
Figure 9B:
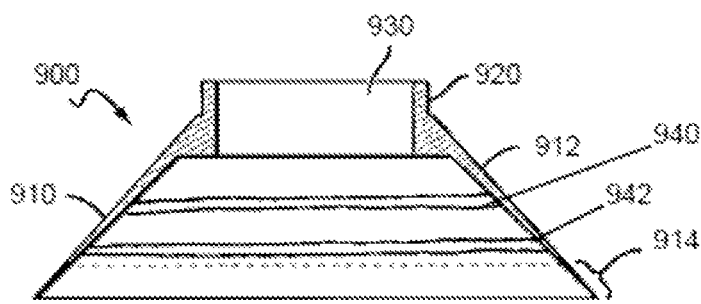

FIGS. 9A-9B illustrate another embodiment of a skirt valve 900 having circular ribs 940 and 942, which are configured to strengthen a rigidity of the valve 900. Although the ribs 940 and 942 are shown having a circular shape, it is contemplated that the shape of the ribs 940 and 942 can vary, especially depending upon the shape of the valve 900. With respect to the remaining numerals in each of FIGS. 9A-9B, the same considerations for like components with like numerals of FIG. 5A apply.

The valves of FIGS. 5A through 9B are preferably comprised of materials providing flexibility and rigidity, include rubbers, plastics, polymers, foams, composite materials, or a combination of dissimilar materials. It is preferred that the rigidity of the valve decrease radial from the center of the valve out toward the edges. Viewed from another perspective, the flexibility of the valves increase radially from the center of the valve out toward the edges.

In some valves of the inventive subject matter, the rigidity of the valve varies such that the valve will flex at some portions, thus permitting fluid or debris to pass through, and will remain rigid at other portions. In portions that flex, it is contemplated the valve will flex in response to a mass of at least 0.1, 0.5, 0.8, 1, 1.1, 1.2, 1.3, 1.4, 1.5, 1.8, 2, 2.2, 2.4, 2.6, 2.8, 3, or 3.5 grams over a 4 $mm^2$ area of the valve surface, while in some embodiments the valve will flex in response to a mass of at least 4, 4.5, 5, 5.5, 6, 6.5, 7, 7.5, 8, 8.5, 9, 9.5, 10, 12, or 15 grams over a 9 $mm^2$ area of the valve surface. In preferred embodiments, the valve thickness will vary such that, along a region of the valve surface within at least 2, 1.8, 1.6, 1.4, 1.2, 1, 0.8, 0.6, 0.5, 0.4, 0.3, or 0.2 inches from the outer edge of the valve, food debris weighing at least 1, 1.5, 2, 2.5, 3, 3.5, 4, 4.5, 5, 6, 7, 8, 9, or 10 grams will depress (flex) a portion of the valve and pass through the valve.

The surfaces of the view can have various textures. The upper (upstream) surface and the lower (downstream) surface of the valve can have the same texture, while in preferred embodiments the textures will differ. It is contemplated that the upper surface may have a smooth surface, or may have a non-stick coating or other coating having a low coefficient of friction. The lower surface may have irregular texturing or symmetric texturing optimized for abstracting sound waves. It is also contemplated that the lower surface of the valve be coated with a sound absorbing material, such as acoustic fiberglass, acoustic foam, acoustic cotton, acoustic fiber, acoustic polymer, or other acoustic materials having high acoustic impedance. It is also contemplated that the lower surface be coated with material having high acoustic reflection coefficient. The lower surface can further be contoured or configured such that acoustic waves originating from downstream (e.g. a grinding chamber) are reflected toward the chamber, or at least in a direction away from a user.

Valves of the inventive subject matter can be shaped, coated, composed, oriented, or otherwise adapted and incorporated into drains in order to absorb, reflect, or otherwise reduce the decibel level of an operating winding device as perceived by a user. In some embodiments, the valves reduce the decibel level of an operating grinding device, as perceived by a user, by at least 5%, 10%, 15%, or 20%, while in preferred embodiments the reduction is at least 25%, 30%, 35%, 40%, 50%, or 60%, and in especially preferred embodiments the reduction is by as much as 90%. In some embodiments, the decibel level perceived by a user operating a grinding device is according to the systems, methods, and devices of the inventive subject matter is less than 125 dB, 100 dB, or 95 dB, more preferably less than 90 dB, 85 dB, 80 dB, 75 dB, 70 dB, 65 dB, 60 dB, 55 dB, 50 dB, 45 dB, or 40 dB, and even more preferably less than 35 dB, 30 dB, 25 dB, 20 dB, or 15 dB.

FIG. 10 depicts a sink and drain combination 1000 comprising sink 1010 and valve device 1030. As shown, sink 1010 includes sink drain 1020, which provides for the draining of fluid and debris out of the sink. Valve device 1030 is shown inserted into sink drain 1020. In some embodiments, valve device 1030 can be removed and reinserted by a user. In some embodiments, valve device 1030 and sink drain 1020 form a seal when valve device 1030 is inserted into sink drain 1020. As depicted, valve device 1030 is an embodiment of the inventive subject matter as disclosed throughout this application. As such, sink and drain combination 1000 is capable of draining sink 1010 of fluid or debris such that valve device 1030 is in a closed configuration after draining sink 1010, and is capable of muffling any noise from operating a grinding device.

Figure 11:
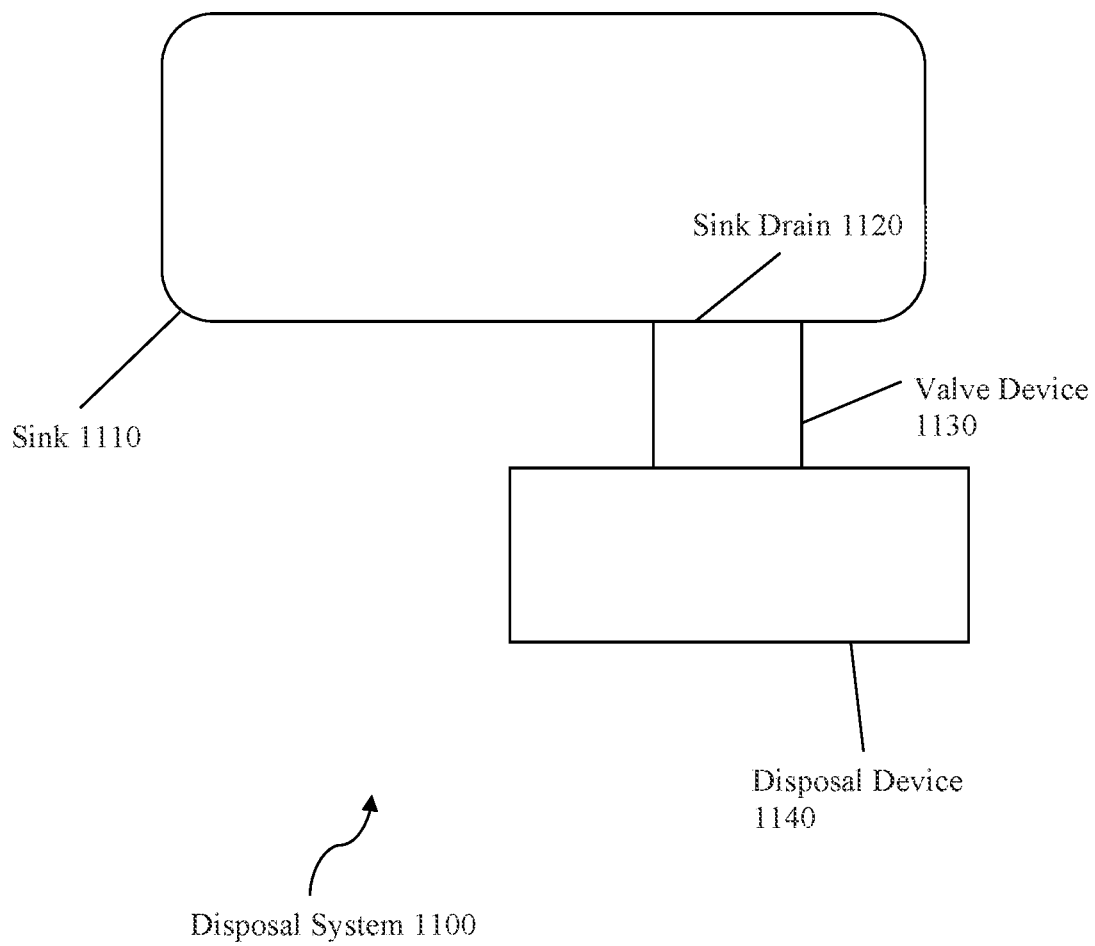
FIG. 11 is a front perspective view of an embodiment of a disposal system.

FIG. 11 depicts disposal system 1100, which comprises sink 1110, valve device 1130, and disposal device 1140. As shown, valve device 1130 is fluidly connected to sink 1110 via sink drain 1120, and is also fluidly connected to disposal device 1140. In some embodiments, valve device 1130 is an embodiment of the inventive subject matter as disclosed throughout this application. Disposal system 1100 is configured such that valve device is capable of draining fluid or debris from sink 1110 through sink drain 1120 and into disposal device 1140. After sink 1110 is empty, valve device 1130 defaults to a closed position such that disposal device 1140 is at least partially sealed from sink 1110. Because valve device 1130 is biased to a closed position, any operating noise from disposal device 1140 is reduced.

FIGS. 12A-12B illustrate another perspective of a valve device for reducing the sound of a garbage disposal. Valve device 1200 comprises housing 1210, skirted valve 1220, and baffle 1250. FIG. 12A depicts a top down view of valve device 1200, where baffle rim 1232 is seated tightly around housing 1210. In some embodiments housing 1210 has a diameter of less than 1 inch, but could have a diameter ranging from 1-2 inches, 2-3 inches, 3-5 inches, or 4-6 inches. Housing 1210 comprises housing rim 1211 housing post 1214 which is supported by housing support beam 1212. Housing post 1214 is connected to and supports skirted valve 1220, which is disposed within housing 1210. FIG. 12B shows a vertical cross-section of valve device 1200 seated within disposal housing 1240. As depicted, baffle 1230 comprises baffle rim 1232 and baffle ribs 1234. In this embodiment, baffle 1230 is disposed snugly around housing 1210, with baffle rim 1232 setting flush with a top edge of housing 1210. It is preferred that baffle 1230 and its components be made of a pliable, rubberized material such that a tight seal can be formed between disposal housing 1240 and housing 1210.

In some embodiments baffle 1230 is first seated around housing 1210. When baffle 1230 is made of a pliable material, the baffle is stretched and pressed around housing 1210 until the baffle is tightly seated on the housing. Housing 1210 further comprises housing ribs 1216, which press into and secure baffle 1230 when seated around housing 1210. In preferred embodiments, a unit comprising baffle 1230 seated around housing 1210 can be sold as valve cartridge 1270. When baffle 1230 is made of rubberized materials, valve cartridge 1270 can be pressed into disposal housing 1240 in order to reduce the sound of a garbage disposal. Baffle ribs 1234 are preferably sized and designed such that when valve cartridge 1270 is pressed into disposal housing 1240, a waterproof seal is for between disposal housing 1240, baffle 1230, and housing 1240. In some embodiments, baffle ribs 1234 protrude 1 mm from baffle 1230, but can also range from 0.5 mm-1 mm, 1 mm-5 mm, 5 mm-15 mm, 10 mm-20 mm, or 15 mm-35 mm.

Skirted valve 1220 is held in position within housing 1210 via housing post 1214 and valve connector 1250. In some embodiments skirted valve 1220 has a diameter of less than 1 inch, but could have a diameter ranging from 1-2 inches, 2-3 inches, 3-5 inches, or 4-6 inches. Skirted valve 1220 can be sized and dimensioned such that skirted valve 1220 has a surface area ranging from 2-6 $in^2$, 5-15 $in^2$, 10-20 $in^2$, or 20-35 $in^2$. Skirted valve 1220 comprises valve collar 1222, which sets atop valve connector shelf 1255 and around a portion of valve connector 1250. Valve connector 1250 and housing post 1214 connect to each other at threaded interface 1260, with valve connector 1250 and housing post 1214 each comprising a mated, threaded portion. When skirted valve 1220 is fastened to housing post 1214, an outer portion of skirted valve 1220 presses against valve seat 1218 and thereby reduces the noise of a garbage disposal.

FIG. 13 depicts valve housing 1300 comprising housing 1310, housing ribs 1316, housing rim 1311, housing support 1312, housing post 1314, and valve seat 1318. Housing ribs 1316 are raised edges along the exterior circumference of housing 1310 configured to engage with a flexible baffle, such as baffle 1600 in FIG. 16. As depicted, housing support 1312 extends from an interior wall of housing 1310 at an angle away from valve seat 1318 and toward housing rim

1311. It should be appreciated that housing support 1312 can also extend in a direction perpendicular to an interior wall of housing 1310, or at an angle away from housing rim 1311 and toward valve seat 1318. Housing post 1314 is disposed at, an end of housing support 1312 toward the center of housing 1310.

FIG. 14 depicts an additional embodiment of the inventive subject matter, valve housing 1400. Valve housing 1400 comprises housing 1410, housing ribs 1416, housing din 1411, housing supports 1412 and 1413, housing post 1414, and valve seat 1418. Elements depicted in FIG. 14 having similar numbering (i.e. last two digits) as FIGS. 12*a-b* and 13 above have the same description. As depicted, housing support 1412 and 1413 meet at housing post 1414 and form a 180° angle in a horizontal plane. It should be appreciated that housing support 1412 and 1413 could form an angle ranging from 90°-180°, 60°-120°, 70°-140°, or 120°-180° in a horizontal plane. Housing support 1412 and 1413 also meet at housing post 1414 and form a 130° in a vertical plane. It should be appreciated that housing support 1412 and 1413 could form an angle ranging from 90°-180°, 90°-120°, 70°-140°, or 120°-180° in a vertical plane.

Figure 15:
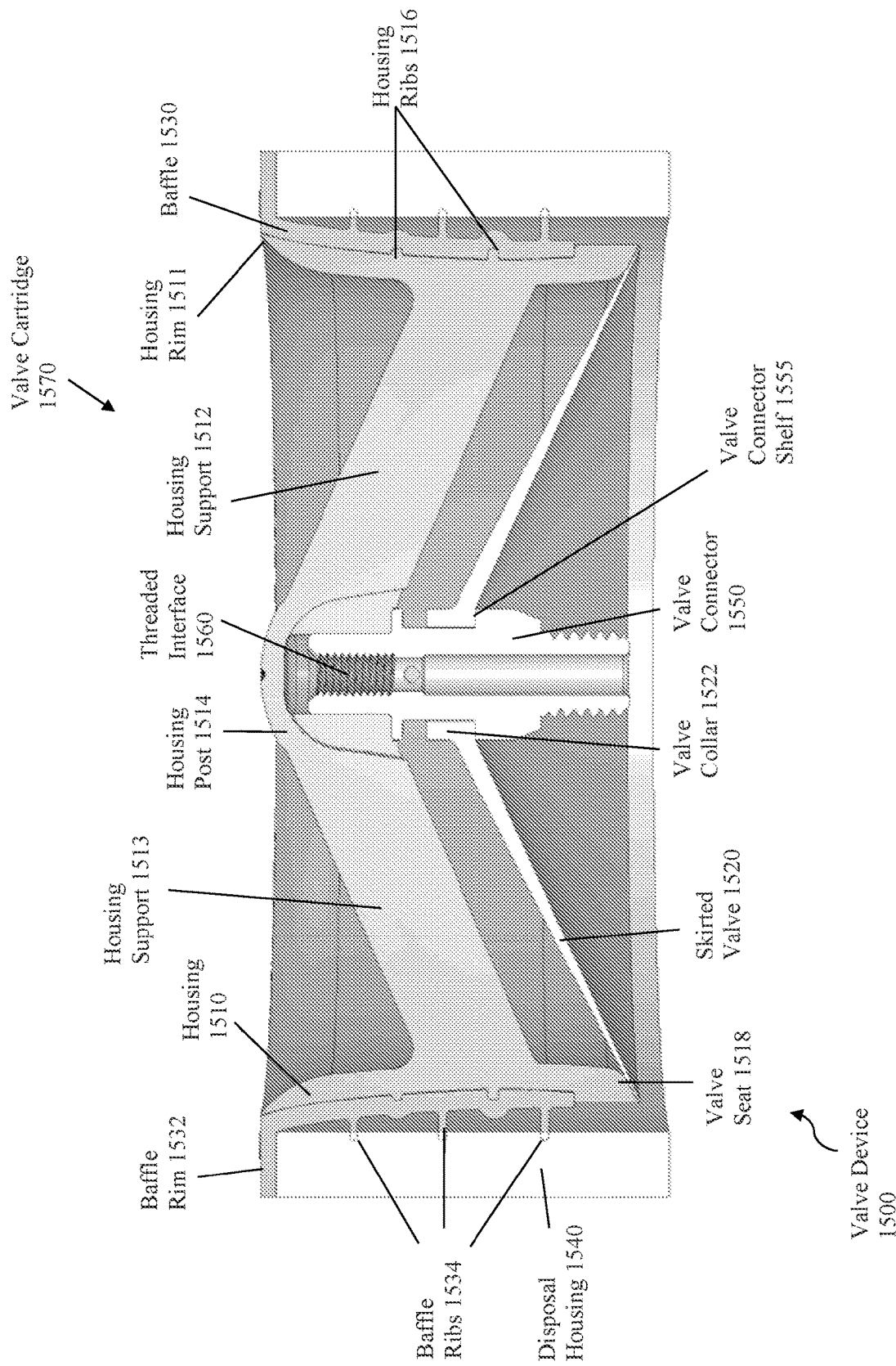
FIG. 15 is a cross-sectional view of another embodiment of a valve device.

FIG. 15 depicts valve device 1500 of the inventive subject matter. Elements depicted in FIG. 15 having similar numbering (i.e. last two digits) as FIGS. 12*a-b*, 13, and 14 above have the same description.

Figure 16:
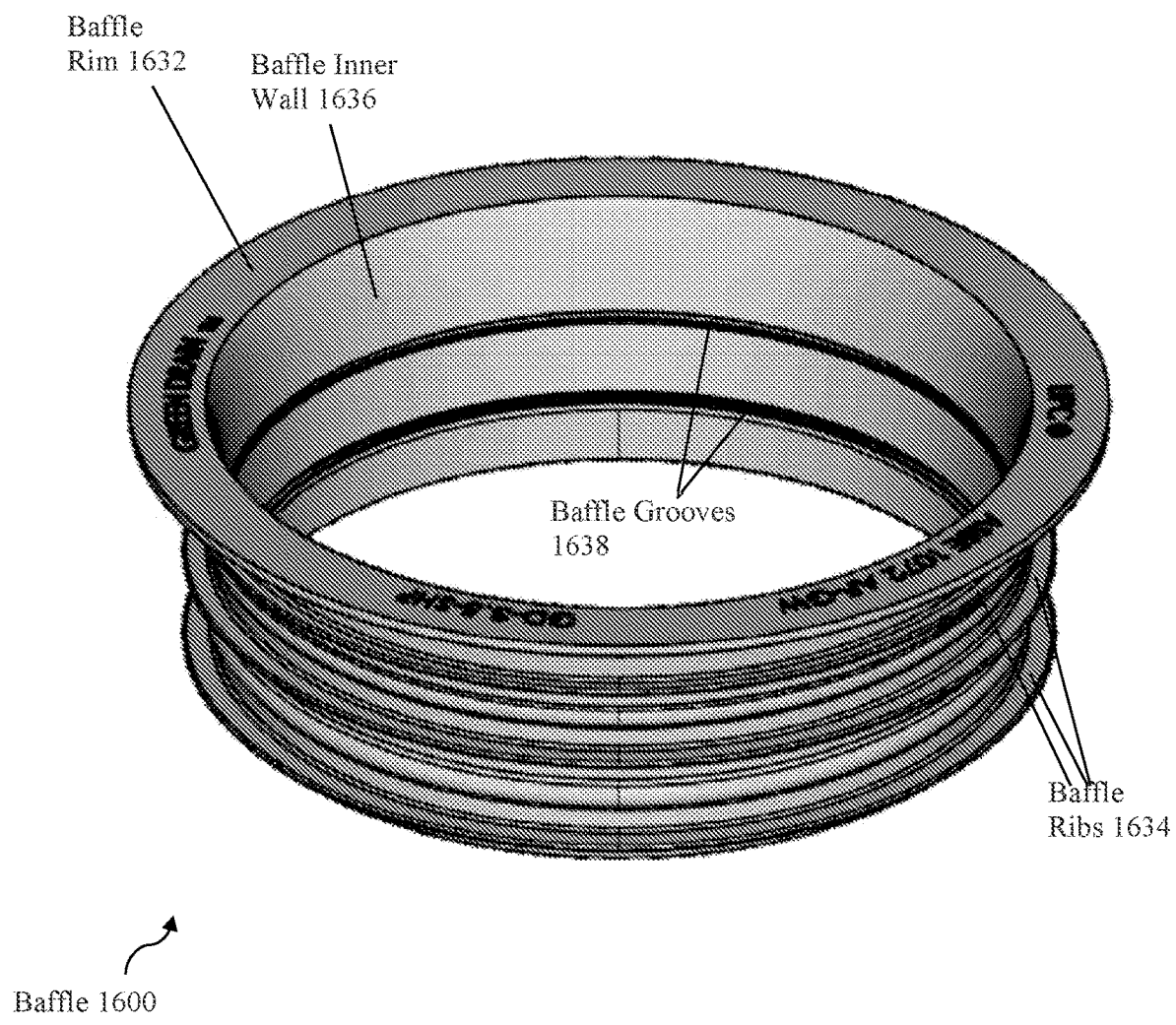
FIG. 16 is a perspective view of an embodiment of a baffle.

FIG. 16 depicts baffle 1600, comprising baffle rim 1632, baffle ribs 1634, baffle inner wall 1636, and baffle groves 1638. Elements depicted in FIG. 16 having similar numbering (i.e. last two digits) as FIGS. 12*a-b* and 15 above have the same description. Baffle 1600 comprises baffle groves 1638 disposed in baffle inner wall 1636. Baffle groves 1638 are sized and dimensioned to receive housing ribs, such as housing ribs 1416 in FIG. 14. The seating of housing ribs 1416 and baffle groves 1638 helps to secure baffle 1600 in place around a valve housing, such as valve housing 1400, and helps to create a water tight seal with a valve housing.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the tennis "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of B, C . . . and N, the text should be interpreted as requiring only one element from the group, not A plus N, or B plus N, etc.

What is claimed is:

1. A grinding device, comprising:
  a valve housing comprising a downwardly-sloping skirted valve configured to be biased to a closed position, the skirted valve disposed about a post;
  a pliable baffle disposed about the valve housing, the pliable baffle having spaced-apart radially-outwardly-projecting circumferential baffle ribs, the valve housing and the pliable baffle together defining a valve cartridge; and
  a grinding chamber disposed downstream of the valve cartridge, the grinding chamber having a disposal housing and at least one arm disposed to spin about an axis;
  wherein the valve cartridge inserted within the disposal housing forms a waterproof seal between the disposal housing, the pliable baffle, and the valve housing, whereby sound during operation of the grinding chamber is reduced due to the pliable baffle and the skirted valve while allowing water and garbage to flow into the grinding chamber through the valve housing via the skirted valve.

2. The device of claim 1, wherein the skirted valve has radially decreasing rigidity.

3. The device of claim 1, wherein the valve cartridge is threadedly coupled to the disposal housing of the grinding chamber.

4. The device of claim 1, wherein the disposal housing of the grinding chamber includes a receptacle configured to receive the valve cartridge.

5. The device of claim 1, wherein the valve cartridge is consumer-replaceable.

6. The device of claim 1, wherein the pliable baffle further comprises a baffle rim configured to engage the disposal housing, whereby the valve cartridge is prevented from passing through the disposal housing and into the grinding chamber.

7. The device of claim 1, wherein a lower surface of the skirted valve is formed having texturing to further reduce sound from the grinding chamber.

8. A food disposal system, comprising a food channel passing in sequence from a sink through a drain, a skirted valve, and a garbage disposal unit, wherein:
  the skirted valve is operably positioned about a post formed within a valve housing and configured to selectively seat against a valve seat formed on the valve housing; and
  a pliable baffle is disposed about the valve housing, the pliable baffle having spaced-apart radially-outwardly-projecting circumferential baffle ribs, the valve housing and the pliable baffle together defining a valve cartridge;
  wherein the valve cartridge inserted within a disposal housing of the garbage disposal unit forms a waterproof seal between the disposal housing, the pliable baffle, and the valve housing, the disposal housing being in fluid communication with the drain of the sink, whereby sound during operation of the garbage disposal unit is reduced due to the pliable baffle and the skirted valve while allowing water and garbage to flow into the garbage disposal unit via the drain and through the valve housing via the skirted valve.

9. The food disposal system of claim 8, wherein the valve cartridge is threadedly coupled to the garbage disposal unit.

10. The food disposal system of claim 8, wherein the drain includes a receptacle configured to receive the valve cartridge.

11. The food disposal system of claim 8, wherein the garbage disposal unit includes a receptacle configured to receive the valve cartridge.

12. The food disposal system of claim 8, wherein the valve cartridge is consumer-replaceable.

13. The food disposal system of claim 8, wherein the skirted valve has radially decreasing rigidity.

14. The food disposal system of claim 8, wherein the pliable baffle further comprises a baffle rim configured to engage the disposal housing, whereby the valve cartridge is prevented from passing through the disposal housing and into the garbage disposal unit.

15. A method for muffling sound emitted from a garbage disposal, comprising the steps of:
utilizing the garbage disposal comprising a grinding chamber having a disposal housing and at least one arm disposed to spin about an axis;
inserting a valve cartridge within the disposal housing of the garbage disposal upstream of the grinding chamber, the valve cartridge comprising a valve housing having an opening and a downwardly-sloping skirted valve configured to be biased to a closed position, the valve cartridge further comprising a pliable baffle disposed about the valve housing, the pliable baffle having spaced-apart radially-outwardly-projecting circumferential baffle ribs, wherein the valve housing is fluidly connected to the garbage disposal and a waterproof seal is formed between the disposal housing, the pliable baffle, and the valve housing;
directing food debris through the valve housing and into the grinding chamber of the garbage disposal; and
activating the garbage disposal, whereby sound during operation of the garbage disposal is reduced due to the pliable baffle and the skirted valve while allowing water and garbage to flow into the grinding chamber of the garbage disposal through the valve housing via the skirted valve.

16. The method of claim 15, wherein the skirted valve is disposed about a post with radially decreasing rigidity.

17. The method of claim 15, further comprising waiting for the food debris to pass through the valve housing before activating the garbage disposal.

18. The method of claim 15, further comprising operating a spigot to produce a flow of water that assists in directing the food debris through the valve housing.

19. The method of claim 15, wherein the valve housing further comprises a valve body having an inlet, an outlet, a sealing surface, and a central shaft positioned within the valve body;
wherein the skirted valve is supported by the central shaft and is arranged with a small end oriented towards the inlet; and further comprising the step of:
directing a flow of fluid through the skirted valve; and
wherein the skirted valve automatically returns to the closed position after the fluid passes the skirted valve.

20. The method of claim 19, wherein at least a portion of the skirted valve abuts the sealing surface when in the closed position.

* * * * *